United States Patent [19]

Yamaharu

[11] Patent Number: 5,562,531
[45] Date of Patent: Oct. 8, 1996

[54] ABRASIVE BRASTING APPARATUS AND DIE FINISHING APPARATUS USING THE SAME

[76] Inventor: Eikichi Yamaharu, 15-10, Kourigaoka 8-chome, Hirakata-shi, Osaka, Japan

[21] Appl. No.: 191,598

[22] Filed: Feb. 4, 1994

[30] Foreign Application Priority Data

Feb. 26, 1993 [JP] Japan ................................. 5-039016

[51] Int. Cl.$^6$ ...................................................... B24C 9/00
[52] U.S. Cl. ............................. 451/88; 451/89; 451/100; 209/30
[58] Field of Search ................................. 451/99, 100, 89, 451/88; 209/17, 21, 30, 31, 233, 234, 255, 256, 258, 237, 719

[56] References Cited

U.S. PATENT DOCUMENTS

| | | |
|---|---|---|
| 3,386,573 | 6/1968 | Martinák. |
| 3,392,491 | 7/1968 | Vogt ............................................. 451/87 |
| 3,631,631 | 1/1972 | Greenstein. |
| 3,662,886 | 5/1972 | Kennedy, Jr. .............................. 209/30 |
| 3,984,943 | 10/1976 | Kono et al. ................................. 451/88 |
| 4,505,077 | 3/1985 | Sheesley et al. ........................... 451/99 |
| 4,581,913 | 4/1986 | Reed. |
| 4,769,956 | 9/1988 | Wern ............................................ 451/99 |
| 4,773,189 | 9/1988 | MacMillan et al.. |
| 4,793,103 | 12/1988 | Baumgart ................................... 451/89 |
| 4,882,881 | 11/1989 | VanKuiken, Jr. .......................... 451/89 |
| 4,928,440 | 5/1990 | Hughes ....................................... 451/88 |
| 4,993,200 | 2/1991 | Morioka et al. ............................ 451/88 |
| 5,025,597 | 6/1991 | Tada et al. .................................. 451/99 |
| 5,035,089 | 7/1991 | Tillman et al. ............................. 451/99 |
| 5,049,260 | 9/1991 | Spears. |
| 5,269,424 | 12/1993 | Lyras .......................................... 451/88 |
| 5,334,019 | 8/1994 | Goldsmith et al. ........................ 451/100 |

FOREIGN PATENT DOCUMENTS

| | | |
|---|---|---|
| 0150338 | 7/1985 | European Pat. Off.. |
| 0522485 | 1/1993 | European Pat. Off.. |
| 3131002 | 3/1983 | Germany. |
| 050291 | 4/1991 | Germany. |
| 18712 | 5/1991 | WIPO. |

Primary Examiner—Bruce M. Kisliuk
Assistant Examiner—Thomas W. Lynch
Attorney, Agent, or Firm—Michael D. Bednarek; Kilpatrick & Cody

[57] ABSTRACT

An abrasive blasting apparatus is provided which comprises a blast nozzle arranged in a blast chamber for blasting, toward a workpiece, two different kinds of abrasive particles separately supplied from a first abrasive container and a second abrasive container. The abrasive particles falling to the bottom of the blast chamber are collected by an abrasive collector, and the collected abrasive particles are separated by an abrasive separating system into those of the first abrasive material and those of the second abrasive material. The two different portions of the abrasive particles are returned separately to the first and second abrasive containers through feedback conduits.

14 Claims, 6 Drawing Sheets

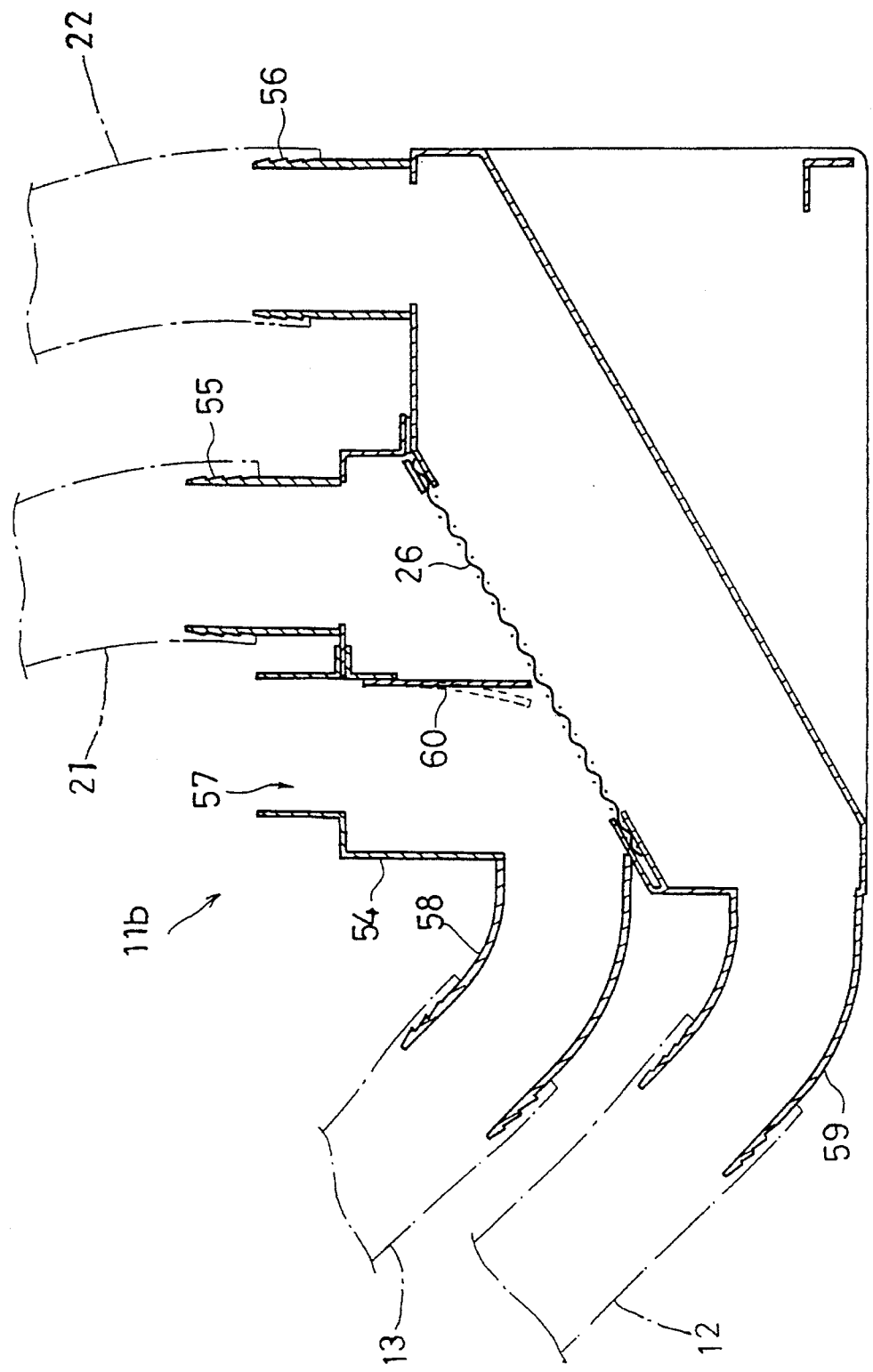

5,562,531

ABRASIVE BRASTING APPARATUS AND DIE FINISHING APPARATUS USING THE SAME

BACKGROUND OF THE INVENTION

1. Field of the Invention

This invention relates to an abrasive blasting apparatus which utilizes a blast of abrasive particles for surface treatment of a workpiece. The present invention also relates to a die or mold finishing apparatus which uses such an abrasive blasting apparatus the finish inner cavity surfaces of a die or mold as a workpiece.

For simplicity, the term "die" is used in the following description to mean either one of a die or a mold.

2. Description of the Prior Art

An abrasive blasting apparatus utilizes a blast of abrasive particles entrained in a high-speed air flow, and is widely used for performing surface treatments (e.g. ground conditioning, Butler finishing, and etc.) of metal workpieces or the like or for removing flashes or burrs of formed resin or metal products. The hardness, grain size and/or other characteristics of the abrasive particles are suitably selected depending on the nature of the workpiece and/or the purposes of the blasting operation.

Typically, a suction-type abrasive blasting apparatus comprises a blast chamber, a blast nozzle arranged in the blast chamber, and an abrasive container for storing particles of an abrasive material. The blast nozzle is connected to an external air source through an air supply hose on one hand, and to the abrasive container through an abrasive supply hose on the other hand. When the air source is actuated to pass a high-speed air stream through the blast nozzle, the abrasive particles gravitationally introduced into the blast nozzle are drawn into the high-speed air stream for blasting under the assistance of the suction force generated by the air stream.

For improving the quality of surface finishing, it is often necessary to perform the surface finishing at least in two successive stages which include rough finishing (primary finishing) and final fine finishing (secondary finishing). Relatively hard, coarse abrasive particles are used for the rough finishing, whereas relatively soft, fine abrasive particles are used for the final fine finishing.

The conventional abrasive blasting apparatus described above is not suitable for performing such a two-stage surface treatment. Specifically, since the conventional apparatus utilizes a single abrasive material, it is necessary to entirely replace the abrasive material by a new batch of a different abrasive material for the secondary finishing after completing the primary finishing. Obviously, such a change of abrasive materials is very troublesome and will result in low process efficiency. Further, if a portion of the abrasive material for the primary finishing is unexpectedly left in the system (which is quite likely) and mixed with the later loaded abrasive material, the quality of the secondary finishing will be inevitably deteriorated.

It is also conceivable to use two different abrasive blasting apparatuses for separately performing the two kinds of surface treatments. However, such a solution leads to an unacceptable increase of equipment cost.

The requirement for a two-stage surface treatment is particularly strict with respect to dies which are used for forging, die casting, resin molding, and the like. The strict requirement is attributable to the fact that a recent development in electrical discharge machining has made it possible to obtain a die which has a very complicated inner cavity. Indeed, due to the complication of the inner cavity, two-stage surface finishing of the die need be performed primarily by intensive manual operations. Thus, there is a strong need for automating the two-stage surface finishing operation with respect to dies.

SUMMARY OF THE INVENTION

It is, therefore, an object of the present invention to provide an abrasive blasting apparatus which is capable of circulating at least two different abrasive materials for performing different blasting operations in a single blast chamber.

The present invention also provides a die finishing apparatus which uses such an abrasive blasting apparatus.

According to the present invention, there is provided an abrasive blasting apparatus comprising: a blast chamber; blast nozzle means arranged in the blast chamber for blasting abrasive particles, which are entrained in a high-speed air flow, toward a workpiece; a first abrasive container for storing particles of a first abrasive material; a second abrasive container for storing particles of a second abrasive material differing from the first abrasive material in grain size; supply means for supplying the abrasive particles separately from the first and second abrasive containers to the blast nozzle means; abrasive collecting means for collecting the abrasive particles from the blast chamber; abrasive separating means for separating the collected abrasive particles into those of the first abrasive material and those of the second abrasive material; and feedback means for returning the separated particles of the first abrasive material and the separated particles of the second abrasive material separately to the first and second abrasive containers, respectively.

According to a preferred embodiment of the present invention, each of the first and second abrasive containers is a cyclone separator connected to a dust collector which generates a suction force, the suction force of the duct collector serving to return the particles of the first abrasive material and the particles of the second abrasive material to the first abrasive container and the second abrasive container, respectively. It is also preferable that if the abrasive collecting means is a cyclone separator connected to a bottom portion of the blast chamber through a collecting conduit, then the cyclone separator is operable by the suction force of the dust collector.

Advantageously, the supply means may comprise a common abrasive supply conduit connected to the blast nozzle means, a first conduit branch connecting the first abrasive container and the common abrasive supply conduit, and a second conduit branch connecting the second abrasive container and the common abrasive supply conduit. In this case, the first and second conduit branches may be provided with respective control valves which are separately operable.

The abrasive separating means may preferably comprise a primary abrasive separating unit for separating the abrasive particles from the abrasive collecting means into a first abrasive portion containing particles of the first abrasive material and a second abrasive portion mainly containing particles of the second abrasive material which is larger in grain size than the first abrasive material, and a secondary abrasive separating unit to screen particles of the first abrasive abrasive material partially contained in the second abrasive portion for joining with the first abrasive portion.

The primary abrasive separating unit may be in the form of a vibrating screen device comprising a plurality of vertically spaced screens. In this case, each higher one of the screens need be larger in mesh size than any lower one of the screens, thereby performing progressive screening.

The secondary abrasive separating unit may comprise a casing, and an inclined screen dividing the casing into an upper space and a lower space. In this case, the casing is provided with an abrasive inlet for introducing the second abrasive portion into the upper space, and another abrasive inlet for introducing the first abrasive portion into the lower space. Preferably, the casing may be provided with an air inlet for introducing air into the upper space of the casing.

According to another aspect of the present invention, there is provided a die finishing apparatus comprising: a blast chamber; blast nozzle means arranged in the blast chamber for blasting abrasive particles, which are entrained in a high-speed air flow, toward a die as a workpiece; a first abrasive container for storing particles of a first abrasive material; a second abrasive container for storing particles of a second abrasive material differing from the first abrasive material in grain size; supply means for supplying the abrasive particles separately from the first and second abrasive containers to the blast nozzle means; abrasive collecting means for collecting the abrasive particles from the blast chamber; abrasive separating means for separating the collected abrasive particles into those of the first abrasive material and those of the second abrasive material; feedback means for returning the separated particles of the first abrasive material and the separated particles of the second abrasive material separately to the first and second abrasive containers, respectively; an actuator for supporting and moving the blast nozzle means three-dimensionally; and a controller for controlling the actuator.

Preferably, the die finishing apparatus may further comprise a feed table arranged outside the blast chamber, and a carriage supporting the die for movement between a first position within the blast chamber and a second position on the feed table.

Other objects, features and advantages of the present invention will be fully understood from the following detailed description given with reference to the accompanying drawings.

BRIEF DESCRIPTION OF THE DRAWINGS

In the accompanying drawings:

FIG. 6 is a sectional view taken along lines VI—VI in FIG. 3.

DETAILED DESCRIPTION OF THE PREFERRED EMBODIMENT

Figure 1:
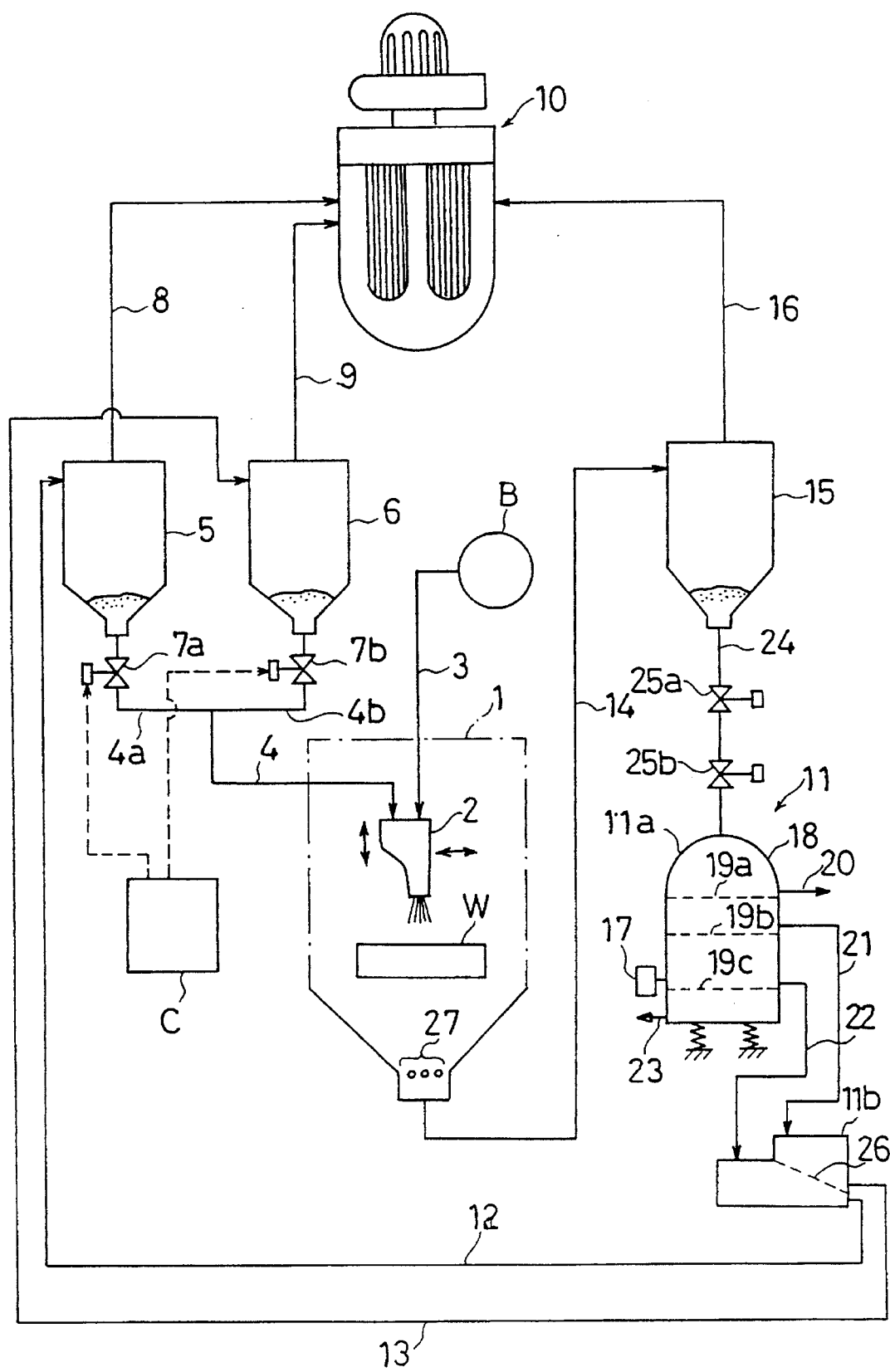
FIG. 1 is a schematic view showing an overall arrangement of an abrasive blasting apparatus according to an embodiment of the present invention.

Referring first to FIG. 1 of the accompanying drawings, there is schematically illustrated an abrasive blasting apparatus according to an embodiment of the present invention. It should be appreciated that FIG. 1 only shows a basic overall arrangement of the blasting apparatus, whereas the detailed arrangement of the blasting apparatus is shown in FIGS. 2–6 and described later.

The abrasive blasting apparatus comprises a blast chamber 1 in which a blast nozzle 2 is arranged in facing relation to a workpiece W such as a die. The blast nozzle 2, which may be of the so-called suction type, has a base end which is connected to an air supply conduit 3 and an abrasive supply conduit 4. The air supply conduit 3 extends from a low pressure air source B such as a Root's blower. The blast nozzle 2 is designed to blast abrasive particles entrained in a high speed air flow which has low pressure but high flow rate. Preferably, the air source B is capable of supplying air at a relatively low pressure of 0.3–1.0 atm. (gauge pressure) to enable the blast nozzle to generate a high-speed air flow of 200 m/s for example.

The abrasive supply conduit 4 is bifurcated into a first conduit branch 4a connected to a first abrasive container 5, and a second conduit branch 4b connected to a second abrasive container 6. The first and second conduit branches 4a, 4b are provided with respective control valves 7a, 7b which are controlled separately by a controller C for opening and closing.

The first abrasive container 5 receives and stores a first abrasive material having a relatively small grain size (average size) and a relatively small specific weight. For instance, the first abrasive material may comprise 180-mesh alumina particles. Such an abrasive material is suitable for final fine finishing.

On the other hand, the second abrasive container 6 receives and stores a second abrasive material having a relatively large grain size (average size) and a relatively large specific weight. For example, the second abrasive material may comprise 60-mesh alumina particles. Such an abrasive material is suitable for rough finishing.

Each of the first and second abrasive containers 5, 6 may be preferably a cyclone separator for example. The respective abrasive containers 5, 6 are connected to a dust collector 10 through respective dust conduits 8, 9. Further, the respective abrasive containers 5, 6 are also connected to respective abrasive feedback conduits 12, 13 which separately feed back the particles of the first and second abrasive materials to the respective containers 5, 6 after separation at an abrasive separating system 11.

When the dust collector 10 operates, a negative pressure is applied to the respective abrasive containers 5, 6 through the respective dust conduits 8, 9. As a result, the negative pressure within the abrasive containers 5, 6 causes the particles of the first and second abrasive materials to be returned to the respective containers through the respective feedback conduits 12, 13, whereas relatively light fine dust contained in the returning abrasive materials is carried to the dust collector 10 through the dust conduits 8, 9. The returned abrasive particles gravitationally fall within the respective abrasive containers 5, 6 for storing therein.

The respective conduit branches 4a, 4b are connected to the respective bottom hopper portions of the first and second abrasive containers 5, 6. Thus, when the control valves 7a, 7b are opened while air is supplied to the blast nozzle 2 at low pressure and at high speed, the abrasive particles stored in the respective containers 5, 6 are supplied to the blast nozzle 2 by gravity and by the suction force generated by the low-pressure high-speed air.

The abrasive particles fall to the bottom of the blast chamber 1 after impingement on the workpiece W for blasting surface treatment, and are collected in an abrasive collector 15 through a collecting conduit 14. The abrasive collector 15 may be also a cyclone separator, similarly to the first and second abrasive containers 5, 6. The abrasive collector 15 is connected to the dust collector 10 through a dust conduit 16.

While the dust collector 10 is operating, a negative pressure is applied to the abrasive collector 15 through the dust conduit 16. As a result, the abrasive particles at the bottom of the blast chamber 1 are sucked up, through the collecting conduit 14, into the abrasive collector 15 and fall therein. Further, relatively light fine dust entrained with the collected abrasive particles is sent to the dust collector 10 through the dust conduit 16.

In a certain operating condition, the abrasive particles collected at the bottom of the abrasive collector 15 contain particles of the first abrasive material from the first abrasive container 5, and particles of the second abrasive material from the second abrasive container 6. The mixed abrasive particles are supplied to the abrasive separating system 11 through a mixture supply conduit 24 for separation into a portion of the first abrasive material portion (suitable for final fine finishing) and a second abrasive material portion (suitable for rough finishing).

According to the illustrated embodiment, the abrasive separating system 11 comprises a primary abrasive separating unit 11a and a secondary abrasive separating unit 11b.

The primary abrasive separating unit 11a may be in the form of a vibrating screen device which is known per se. As schematically illustrated in FIG. 1, the vibrating screen device comprises a container 18 which is oscillated by a vibrator 17, and first to third screens 19a, 19b, 19c which are arranged in the container 18 as suitably spaced vertically. The respective screens 19a–19c have different mesh sizes.

The first or upper screen 19a is provided for removing coarse refuse particles or dregs which, due to a relatively large specific weight, cannot be removed at the abrasive collector 15 (cyclone separator). The second or intermediate screen 19b is provided for separating the particles of the second abrasive material (for rough finishing). The third or lower screen 19c is used for separating the particles of the first abrasive material (for final fine finishing). Thus, the mesh size of the first screen 19a is largest, and those of the second and third screens 19b, 19c decrease progressively.

The coarse dregs removed by the first screen 19a are discharged to the exterior through a discharge duct 20. The particles of the second abrasive material separated by the second screen 19b are fed to the secondary abrasive separating unit 11b through a conduit 21. The particles of the first abrasive material separated by the third screen 19c are also fed to the secondary abrasive separating unit 11b through another conduit 22. Relatively heavy fine dust particles, which pass through the third screen 19c, are discharged to the exterior through another discharge duct 23.

According to the illustrated embodiment, the mixture supply conduit 24 is provided with two control valves 25a, 25b which are separately operable. Due to such an arrangement, it is possible to supply the mixed abrasive particles from the bottom of the abrasive collector 15 to the primary abrasive separating unit 11a while maintaining the negative pressure within the abrasive collector 15.

Specifically, the upper control valve 25a is first opened with the lower control valve 25b closed, thereby allowing the mixed abrasive particles in the abrasive collector 15 to move downwardly to the position of the lower control valve 25b. Then, with the upper control valve 25a closed, the lower control valve 25b is opened for allowing the portion of the mixed abrasive particles between the upper and lower control valves 25a, 25b to fall into the primary abrasive separating unit 11a. In this way, either one of the two control valves 25a, 25b is always closed to prevent vacuum leakage from the abrasive collector 15.

The portion of the abrasive particles separated by the second screen 19b may still contain a small amount of particles of the first abrasive material (for final fine finishing). The secondary abrasive separating unit 11b is provided for additionally screening the thus contained particles of the first abrasive material. For this purpose, the secondary abrasive separating unit 11b is provided therein with a screen 26 which corresponds in mesh size to the second screen 19b of the primary abrasive separating unit 11a. The details of this separating unit will be described hereinafter.

As previously described, the particles of the first abrasive material passing through the screen 26 are returned to the first abrasive container 5 through the feedback conduit 12. Similarly, the particles of the second abrasive material separated by the screen 26 of the secondary abrasive separating unit 11b are returned to the second abrasive container 6 through the feedback conduit 13.

Reference numeral 27 in FIG. 1 represents magnets disposed at the bottom of the blast chamber 1. When the workpiece W is made of a magnetic metal, these magnets 27 magnetically remove minute particles of the magnetic metal coming off the workpiece W during the blasting surface treatment.

According to the arrangement described above, the control valves 7a, 7b associated respectively with the first and second abrasive containers 5, 6 are separately operable by the controller C. Thus, it is possible to select any one of the following operational modes by suitably controlling the control valves 7a, 7b.

(1) Idle operating mode in which air alone is supplied through the blast nozzle 2 by closing both of the control valves 7a, 7b.

(2) Fine blasting mode in which particles of the first abrasive material from the first abrasive container 5 are blasted by opening the control valve 7a while closing the control valve 7b.

(3) Rough blasting mode in which particles of the second abrasive material from the second abrasive container 6 are blasted by opening the control valve 7b while closing the control valve 7a.

(4) Mixed blasting mode in which particles of the first and second abrasive materials from both of the abrasive containers 5, 6 are blasted by opening both of the control valves 7a, 7b, the mixture ratio being adjustable by changing the degree of opening with respect to each of the control valves.

Apparently, the rough blasting mode and the fine blasting mode may be performed in immediate succession simply by controlling the respective control valves 7a, 7b. Thus, it is possible to greatly reduce the total time required for performing a die finishing operation which comprises two successive operational modes. Further, it is unnecessary to perform replacement of an abrasive material with respect to each of the abrasive containers 5, 6 at the time of switching between the different operation modes.

FIGS. 2 to 6 show more details of the abrasive blasting apparatus illustrated in FIG. 1. In the illustrated embodiment, the blasting apparatus is designed as a die finishing apparatus 30 (see FIG. 2).

Figure 2:
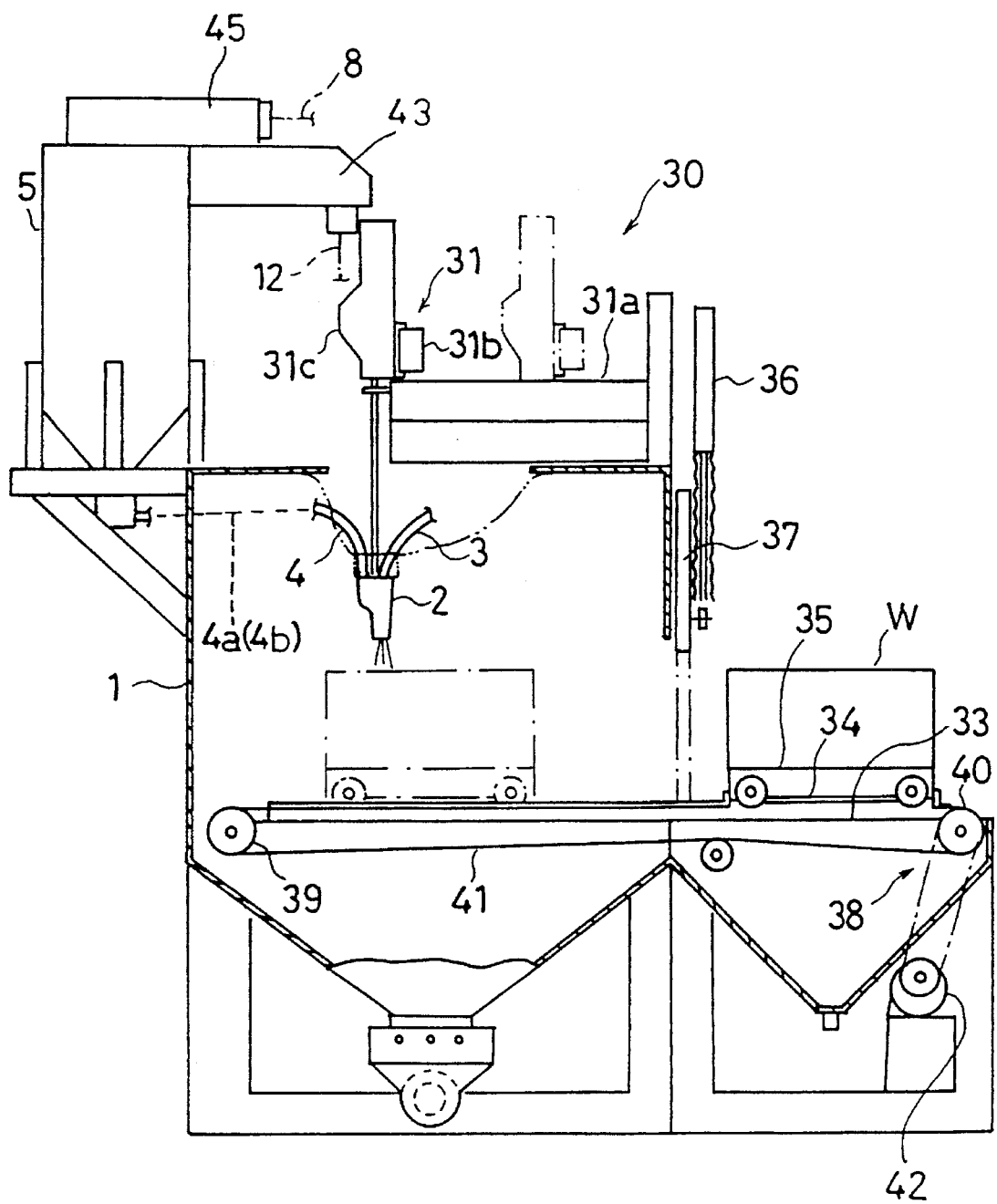
FIG. 2 is a front view, partially in section, showing a die finishing apparatus which uses the basic arrangement shown in FIG. 1.
Figure 3:
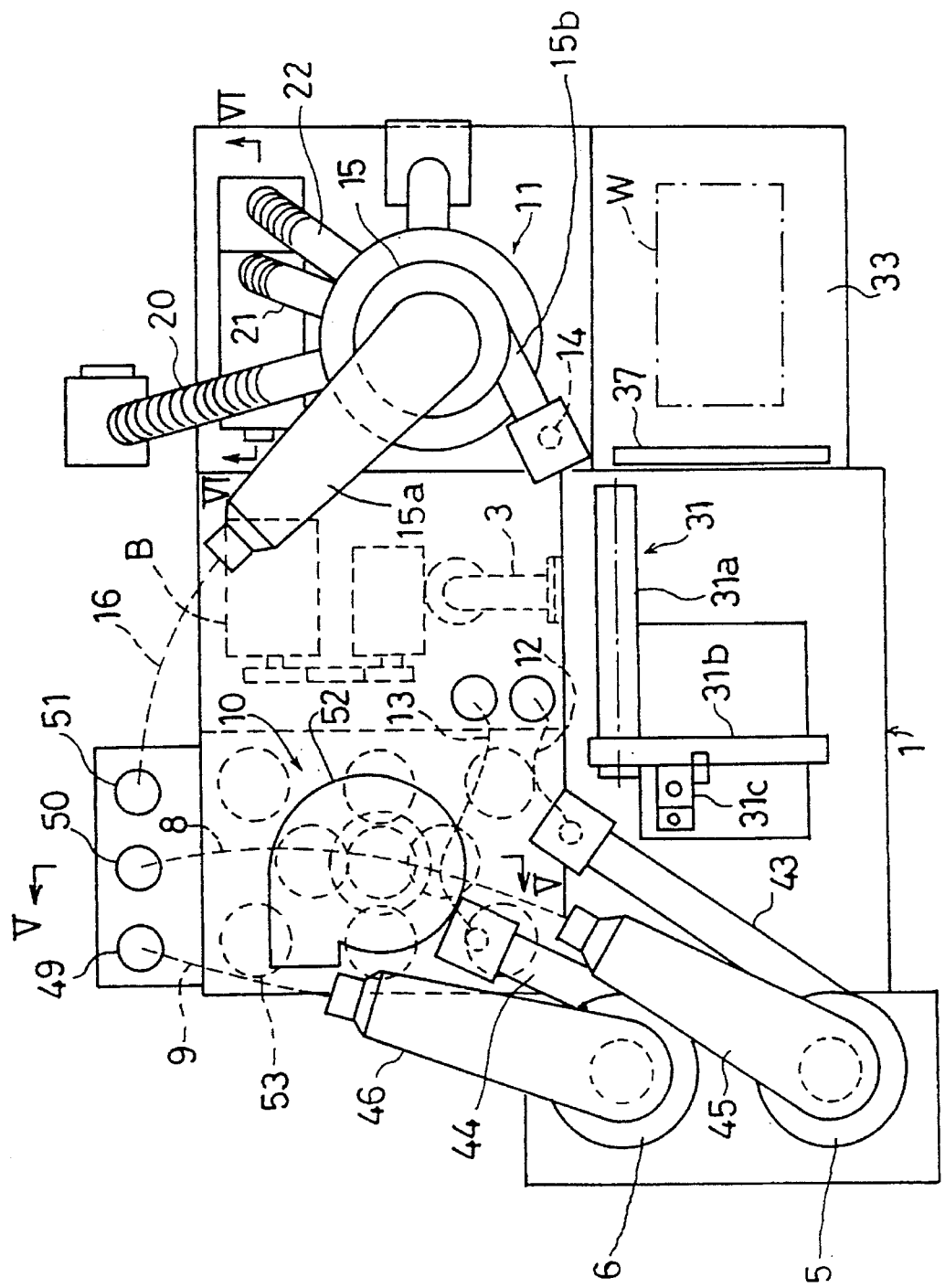
FIG. 3 is a plan view showing the same die finishing apparatus.
Figure 4:
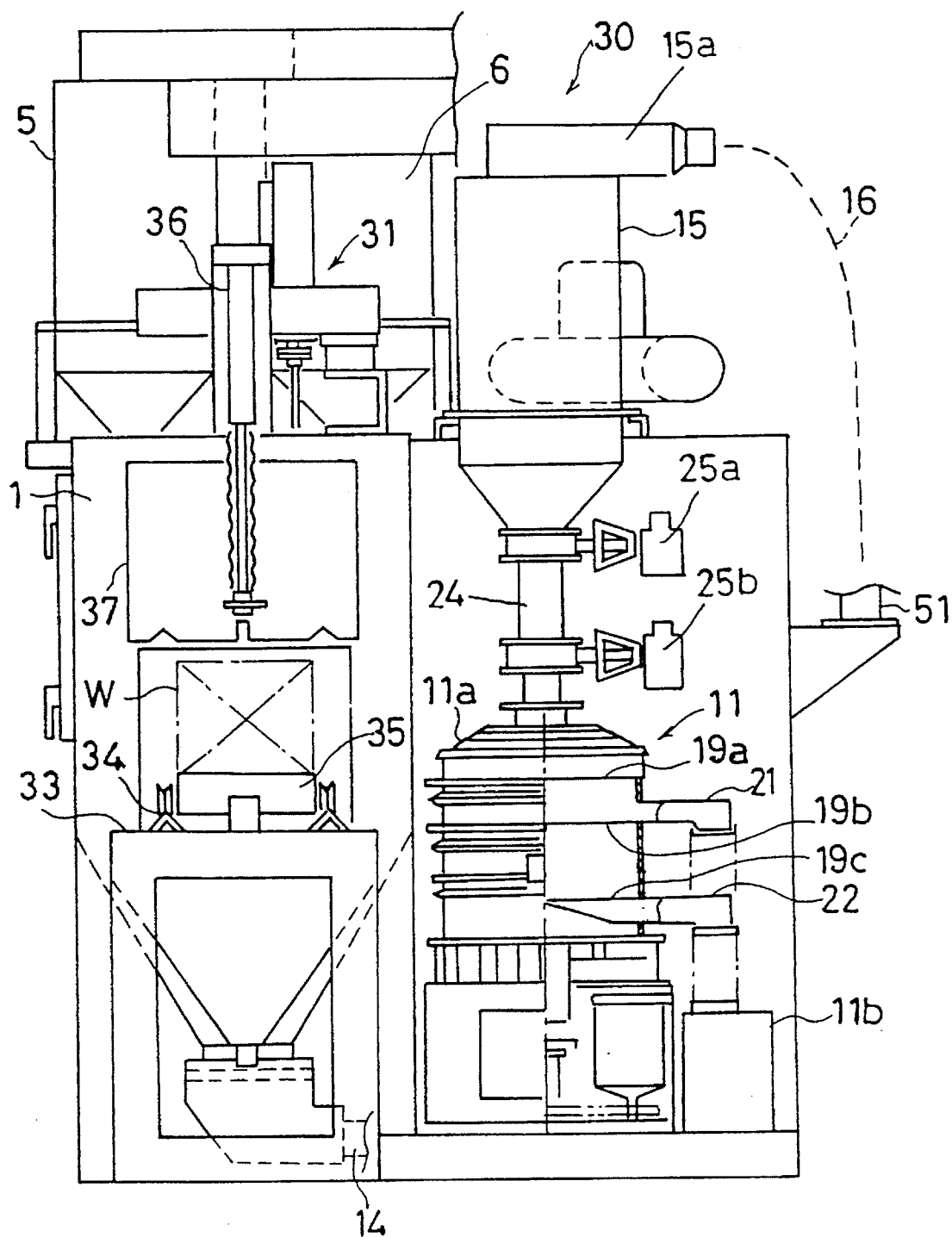
FIG. 4 is a side view showing the same die finishing apparatus.

As shown in FIGS. 2 to 4, the blast nozzle 2 is supported by a triaxial or three-dimensional actuator 31 within the blast chamber 1 which is a box-like structure having a bottom hopper portion according to the illustrated embodiment. The controller C (see FIG. 1) for operating the control valves 7a, 7b also controls the triaxial actuator 31 for three-dimensional movement.

As shown in FIG. 3, the triaxial actuator 31 includes an X-axis linear guide 31a, a Y-axis linear guide 31b mounted on the X-axis linear guide 31a, and a Z-axis linear guide 31c mounted on the Y-axis linear guide 31b. The triaxial actuator 31 itself may be of the known type.

On one side of the blast chamber 1 is arranged a feed table 33 which is provided with a pair of guide rails 34 extending into the blast chamber 1. A carriage 35 supporting the workpiece W is supported on the pair of rails 34 for horizontal movement into and out of the blast chamber 1. Obviously, the workpiece W for the die finishing apparatus 30 is a die.

The blast chamber 1 has an access opening (see FIG. 2) near the feed table 33. The access opening is closable by a slide door 37 which is vertically movable by an air cylinder 36.

The carriage 35 is driven by a drive assembly 38 for horizontal reciprocating movement. In the illustrated embodiment, the drive assembly 38 comprises a first sprocket 39 disposed in the blast chamber 1, a second sprocket 40 arranged on the feed table 33, an endless chain 41 extending between the first and second sprockets 39, 40 in engagement therewith, and a reversible motor 42 connected to the second sprocket 40.

For determining the position of the carriage 35, there may be provided limit switches (not shown) suitably disposed for generating position signals. The motor 42 may be rotated (in the forward or opposite direction) or stopped in response to the signals from the limit switches.

The first and second abrasive containers 5, 6 (cyclone separators) are disposed obliquely above the blast chamber 1 (upper left in FIG. 2). The respective bottom hopper portions of the first and second abrasive containers 5, 6 are connected to the first and second conduit branches 4a, 4b which merge into the abrasive supply conduit 4 connected to the blast nozzle 2, as already described. Further, the first and second conduit branches 4a, 4b are provided with the respective control valves 7a, 7b (see FIG. 1).

As shown in FIG. 3, the first abrasive container 5 has a top portion provided with an abrasive inlet 43 and a dust outlet 45. The abrasive inlet 43 extends horizontally and is connected to the secondary abrasive separating unit 11b through the abrasive feedback conduit 12 (see FIG. 1). The dust outlet 45 also extends horizontally and is connected to a dust inlet 50 of the dust collector 10 through the dust conduit 8.

Similarly, the second abrasive container 6 has a top portion provided with an abrasive inlet 44 and a dust outlet 46. The abrasive inlet 44 extends horizontally and is connected to the secondary abrasive separating unit 11b through the abrasive feedback conduit 13 (FIG. 1). The dust outlet 46 also extends horizontally and is connected to another dust inlet 49 of the dust collector 10 through the dust conduit 9.

As appreciated from FIGS. 3 and 4, the dust collector 10, the abrasive separating system 11 and the abrasive collector 15 are all arranged behind the combined assembly of the blast chamber 1 and the feed table 33. The dust collector 10 has a further dust inlet 51, whereas the abrasive collector 15 has a dust outlet 15a which is connected to the dust inlet 51 of the dust collector 10 through the dust conduit 16. The abrasive collector 15 also has an abrasive inlet 15b which is connected to the bottom hopper portion of the blast chamber 1 through the collecting conduit 14 (see FIGS. 1, 3 and 4).

Figure 5:
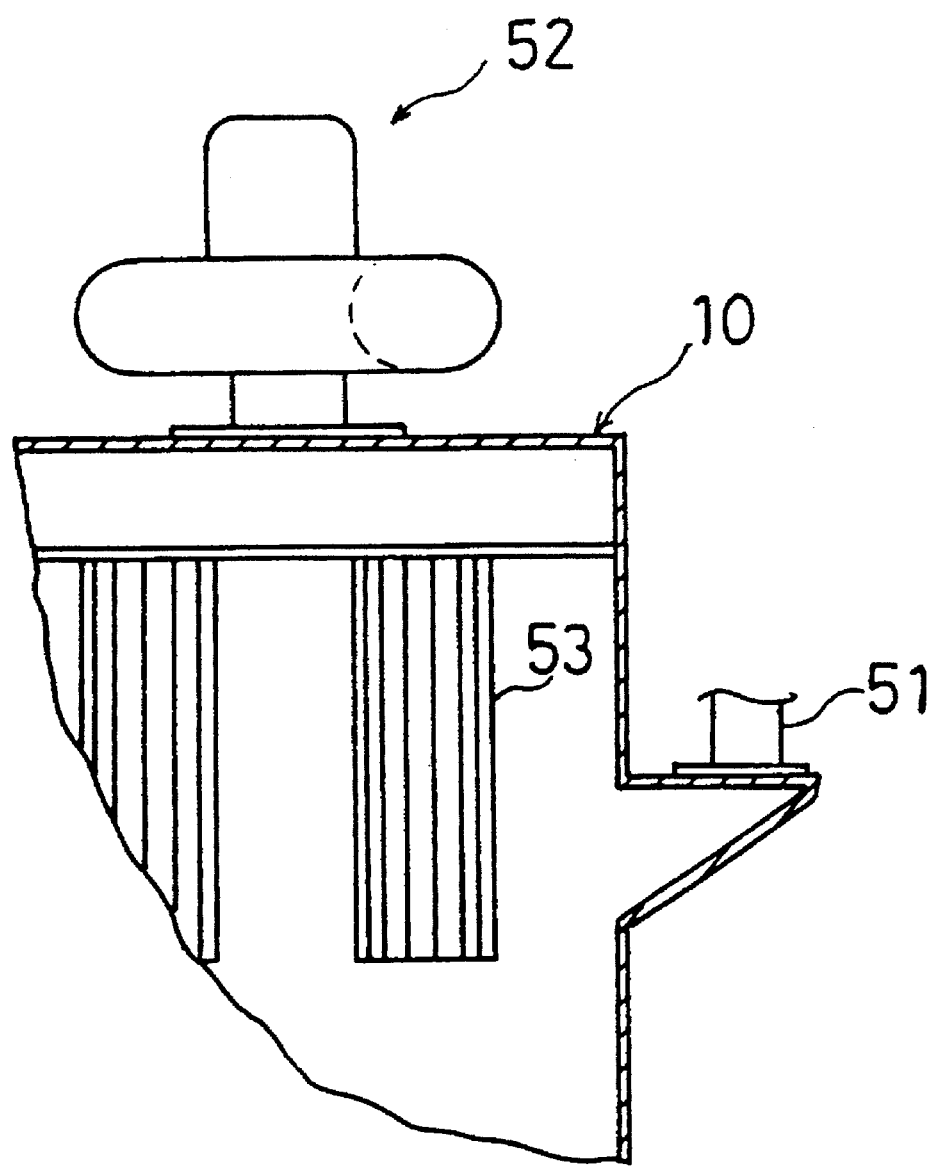
FIG. 5 is a sectional view taken along lines V—V in FIG. 3.

As shown in FIG. 5, the dust collector 10 may be of the known type which comprises a suction fan 52 for generating a negative pressure, and a plurality of dust collecting elements 53. Dust laden air is sucked into the dust collector 10 under the negative pressure generated by the suction fan 52, and the dust is removed by the dust collecting elements 53.

As specifically shown in FIG. 6, the secondary abrasive separating unit 11b comprises a casing 54 in which the screen 26 is arranged in an inclined posture. The casing 54 has an abrasive inlet 55 for connection to the conduit 21 to introduce particles of the second abrasive material into the casing 54 above the screen 26. The casing 54 also has another abrasive inlet 56 for connection to the conduit 22 to introduce particles of the first abrasive material under the screen 26.

The casing 54 further has an air inlet 57 for introducing secondary air into the casing above the screen 26. Moreover, the casing 54 has respective abrasive outlets 58, 59 for connection to the respective feedback conduits 12, 13.

Indicated at 60 is a flexible partition arranged within the casing 54 above the screen 26. The partition may be made of rubber for example.

Most of the abrasive particles (having a relatively large grain size) introduced in the casing 54 through the abrasive inlet 55 are allowed to gravitationally move down on the screen 26 toward the abrasive outlet 58 while part of the abrasive particles (having a relatively small grain size) are allowed to pass through the screen 26. At this time, the secondary air introduced through the air inlet 57 keeps a higher pressure above the screen 26 than below it, thereby preventing the smaller particles from passing reversely through the screen. Further, the secondary air also assists the feedback movement of the particles of the second abrasive material through the feedback conduit 13.

On the other hand, the particles of the first abrasive material introduced into the casing 54 through the other abrasive inlet 56 move down toward the abrasive outlet 59 while joining with the abrasive particles which have passed downwardly through the screen 26. Obviously, the secondary air also assists the feedback movement of the abrasive particles through the feedback conduit 12.

In operation of the die finishing apparatus 30, a die W to be treated is placed accurately in position on the carriage 35 which is located on the feed table 33. At this time, the slide door 37 is open because the carriage 35 has been previously retreated out of the blast chamber 1 for taking out a former die (not shown) which has been already treated.

Then, the carriage 35 together with the supported die W is advanced to a predetermined position within the blast chamber 1, as indicated by phantom lines in FIG. 2. The slide door 37 is closed upon entry of the carriage 35 into the blast chamber 1.

Then, the air source B (FIG. 1) and the dust collector 10 are actuated with both of the control valves 7a, 7b (FIG. 1) closed. As a result, all amounts of the first and second abrasive materials existing in the entire system are separately returned to the first and second abrasive containers 5, 6, respectively.

In the rough finishing mode subsequently performed, the control valve 7b associated with the second abrasive container 6 is opened. As a result, the blast nozzle 2 blasts particles (rough finishing coarse particles) of the second abrasive material, entrained in a low-pressure, high-speed air flow, toward the die W. At this time, the controller C causes the triaxial actuator 31 to move the blast nozzle 2 automatically along a predetermined blasting path for roughly finishing the inner cavity surfaces of the die W in a uniform manner.

Upon lapse of a predetermined time or after the triaxial actuator 31 has performed a predetermined movement cycle, the controller C causes the control valve 7b to close while causing the other control valve 7a associated with the first abrasive container to open. As a result, particles (fine finishing particles) of the first abrasive material are blasted through the blast nozzle 2. At this time, again, the controller C causes the triaxial actuator 31 to move the blast nozzle 2 for finely finishing the entire inner cavity surfaces of the die W in a uniform manner.

Upon lapse of a predetermined time or after the triaxial actuator 31 has performed a predetermined movement cycle, the controller C causes the control valve 7a to close, and the air source B and the dust collector 10 are stopped. Further, the slide door 37 is opened, and the carriage supporting the treated die W is retreated onto the feed table 33.

The above steps may be repeated after replacing the treated die W by a new one. In this way, it is possible to perform a surface finishing operation successively with respect to a plurality of dies.

The die finishing apparatus 30 described above is capable of automatically performing a surface finishing operation of a die cavity which has been conventionally considered to be a troublesome job requiring intensive work. Further, the triaxial actuator is capable to bringing the blast nozzle 2 accurately at any three-dimensional position as required for suitably treating a die which is worked by electrical discharge machining to have a complicated cavity.

Obviously, the present invention is not limited to the specific embodiment described above. For instance, the following modifications may be possible.

(1) Each of the cyclone separators for serving as the abrasive containers 5, 6 and the abrasive collector 15 may be of any type, like the one disclosed in Japanese Patent Application Laid-open No. 1-289666, which is capable of separating abrasive particles from dust.

(2) The abrasive blasting apparatus may be modified to comprise two blast nozzles which are connected respectively to the first and second abrasive containers 5, 6 through separate abrasive supply conduits each provided with a control valve.

(3) The abrasive blasting apparatus may be made to comprise an additional abrasive container for storing a third abrasive material of a different grain size and supplying it to the blast nozzle 2. In this case, the abrasive separating system 11 need be adapted for additional separation of the third abrasive material.

(4) The secondary abrasive separating unit 11b may be omitted.

(5) The triaxial actuator 31 may be replaced by a robot having plural points of articulation.

(6) The low-pressure air source B may be replaced by a compressor if economy admits.

I claim:

1. An abrasive blasting apparatus comprising: a blast chamber;

blast nozzle means arranged in the blast chamber for blasting abrasive particles, the abrasive particles being entrained in a high-speed air flow, toward a workpiece;
a first abrasive container for storing particles of a first abrasive material;

a second abrasive container for storing particles of a second abrasive material differing from the first abrasive material in grain size;

supply means for supplying the abrasive particles separately from the first and second abrasive containers to the blast nozzle means;

abrasive collecting means for collecting the abrasive particles from the blast chamber;

abrasive separating means for separating the collected abrasive particles into those of the first abrasive material and those of the second abrasive material; and separate feedback passages for returning the separated particles of the first abrasive material and the separated particles of the second abrasive material separately and simultaneously, to the first and second abrasive containers, respectively.

2. The apparatus according to claim 1, wherein each of the first and second abrasive containers is a cyclone separator connected to a dust collector which generates a suction force, the suction force of the dust collector serving to return the particles of the first abrasive material and the particles of the second abrasive material to the first abrasive container and the second abrasive container, respectively.

3. The apparatus according to claim 2, wherein the abrasive collecting means comprises a cyclone separator connected to a bottom portion of the blast chamber through a collecting conduit, the cyclone separator as the abrasive collecting means being operable by the suction force of the dust collector.

4. The apparatus according to claim 1, wherein the supply means comprises a common abrasive supply conduit connected to the blast nozzle means, a first conduit branch connecting the first abrasive container and the common abrasive supply conduit, and a second conduit branch connecting the second abrasive container and the common abrasive supply conduit, the first and second conduit branches being provided with respective control valves which are separately operable.

5. The apparatus according to claim 1, wherein the abrasive collecting means is connected to the abrasive separating means through a mixture supply conduit provided with a pair of control valves which are alternately operable.

6. The apparatus according to claim 1, wherein the abrasive separating means comprises a primary abrasive separating unit for separating the abrasive particles from the abrasive collecting means into a first abrasive portion containing particles of the first abrasive material and a second abrasive portion mainly containing particles of the second abrasive material which is larger in grain size than the first abrasive material, the abrasive separating means further comprising a secondary abrasive separating unit to screen particles of the first abrasive material partially contained in the second abrasive portion for joining with the first abrasive portion.

7. The apparatus according to claim 6, wherein the primary abrasive separating unit is a vibrating screen device comprising a plurality of vertically spaced screens, each higher one of the screens being larger in mesh size than any lower one of the screens.

8. The apparatus according to claim 6, wherein the secondary abrasive separating unit comprises a casing, an inclined screen dividing the casing into an upper space and a lower space, the casing being provided with an abrasive inlet for introducing the second abrasive portion into the upper space, the casing being also provided with another abrasive inlet for introducing the first abrasive portion into the lower space.

9. The apparatus according to claim 8, wherein the casing is provided with an air inlet for introducing air into the upper space of the casing.

10. a die finishing apparatus comprising: a blast chamber;

blast nozzle means arranged in the blast chamber for blasting abrasive particles, the abrasive particles being entrained in a high-speed air flow, toward a die as a workpiece;

a first abrasive container for storing particles of a first abrasive material;

a second abrasive container for storing particles of a second abrasive material differing from the first abrasive material in grain size;

supply means for supplying the abrasive particles separately from the first and second abrasive containers to the blast nozzle means;

abrasive collecting means for collecting the abrasive particles from the blast chamber;

abrasive separating means for separating the collected abrasive particles into those of the first abrasive material and those of the second abrasive material;

separate feedback passages for returning the separated particles of the first abrasive material and the separated particles of the second abrasive material separately and simultaneously to the first and second abrasive containers, respectively;

moving means for supporting and moving the blast nozzle means three-dimensionally; and a controller for controlling the moving means.

11. The die finishing apparatus according to claim 10, wherein the supply means comprises a common abrasive supply conduit connected to the blast nozzle means, a first conduit branch connecting the first abrasive container and the common abrasive supply conduit, and a second conduit branch connecting the second abrasive container and the common abrasive supply conduit, the first and second conduit branches being provided with respective control valves which are separately operable by the controller for controlling the moving means.

12. The die finishing apparatus according to claim 10, further comprising a feed table arranged outside the blast chamber, and a carriage for supporting the die, the carriage being movable between a first position within the blast chamber and a second position on the feed table.

13. The die finishing apparatus according to claim 12, wherein the blast chamber has an access opening for allowing passage of the carriage supporting the die, the access opening being closable by a door.

14. The die finishing apparatus according to claim 10, wherein the moving means is a triaxial actuator.

* * * * *